United States Patent
Ball

(10) Patent No.: US 10,267,372 B2
(45) Date of Patent: Apr. 23, 2019

(54) SHOCK ISOLATION PROTECTION OF SENSITIVE COMPONENTS

(71) Applicant: Qioptiq Limited, St. Asaph (GB)

(72) Inventor: Kenneth David Ball, Chester (GB)

(73) Assignee: Qioptiq Limited, St. Asaph (GB)

( * ) Notice: Subject to any disclaimer, the term of this patent is extended or adjusted under 35 U.S.C. 154(b) by 61 days.

(21) Appl. No.: 14/689,519

(22) Filed: Apr. 17, 2015

(65) Prior Publication Data
US 2015/0316113 A1    Nov. 5, 2015

(30) Foreign Application Priority Data

May 2, 2014    (GB) .................................... 1407829.9

(51) Int. Cl.
*F41G 1/38*    (2006.01)
*F16F 1/14*    (2006.01)
(Continued)

(52) U.S. Cl.
CPC ............... *F16F 1/14* (2013.01); *F16F 1/028* (2013.01); *F16F 15/06* (2013.01); *F41G 1/38* (2013.01); *Y10T 29/49828* (2015.01)

(58) Field of Classification Search
CPC .......... F16F 1/3732; F16F 1/3735; F16F 1/37; F16F 15/08; F41G 1/32; F41G 1/38;
(Continued)

(56) References Cited

U.S. PATENT DOCUMENTS 2,005,934 A * 6/1935 Carter ..................... F16F 15/08
180/300

2,936,141 A * 5/1960 Rapata .................... F16C 27/02
248/604

(Continued)

FOREIGN PATENT DOCUMENTS

DE    202 04 928 U1    7/2002
FR    2 992 039    12/2013
(Continued)

OTHER PUBLICATIONS

European Search Report for Application No. 15166065.1, dated Oct. 1, 2015, 4 pages.
(Continued)

*Primary Examiner* — Bradley T King
*Assistant Examiner* — Stephen M Bowes
(74) *Attorney, Agent, or Firm* — Peter A. Nieves; Sheehan Phinney Bass & Green PA

(57) ABSTRACT

A method and device for a compact shock isolation apparatus are disclosed. The apparatus is adapted for mounting a sensitive component to a base. The apparatus includes a collar, a plurality of axial flexures mounted to the base to attenuate an axial shock force/acceleration. A plurality of radial flexures extend axially between the collar and the axial flexures, connecting each of the axial flexures to the collar to attenuate radial and/or circumferential shock forces/acceleration. A plurality of attachment pads disposed between adjacent radial flexures extend axially from the collar toward the axial flexures and attach to the sensitive component. The shock isolation apparatus supports the sensitive component in non-contacting proximity to the base. The apparatus optionally includes vibration dampening material disposed between the sensitive component and the axial flexures and/or the radial flexures.

17 Claims, 7 Drawing Sheets

(51) Int. Cl.
*F16F 15/06* (2006.01)
*F16F 1/02* (2006.01)

(58) Field of Classification Search
CPC . F41G 1/387; G02B 23/2476; G02B 23/2484; G02B 23/12; H02K 5/24
USPC ........... 267/140.5, 141.1; 248/633, 634, 638, 248/603, 604; 359/816; 42/111
See application file for complete search history.

(56) References Cited

U.S. PATENT DOCUMENTS

| | | | |
|---|---|---|---|
| 3,745,387 A * | 7/1973 | Sydnor, Jr. | H02K 5/132 |
| | | | 261/120 |
| 4,076,197 A * | 2/1978 | Dochterman | B60H 1/00464 |
| | | | 248/604 |
| 4,095,347 A * | 6/1978 | Steffan | F41G 1/38 |
| | | | 33/295 |
| 5,310,157 A | 5/1994 | Platus | |
| 5,404,667 A * | 4/1995 | Schmitter | F41G 1/02 |
| | | | 42/111 |
| 5,533,704 A * | 7/1996 | Fischinger | F04D 29/668 |
| | | | 248/603 |
| 6,279,866 B1 * | 8/2001 | Eilemann | H02K 5/24 |
| | | | 248/603 |
| 6,650,412 B1 | 11/2003 | Slater | |
| 7,051,469 B1 * | 5/2006 | Pochapsky | F41G 1/32 |
| | | | 42/111 |
| 7,333,270 B1 * | 2/2008 | Pochapsky | F41G 1/32 |
| | | | 250/330 |
| 2010/0302542 A1 | 12/2010 | Hogg et al. | |
| 2014/0151528 A1 * | 6/2014 | Park | F16F 3/093 |
| | | | 248/634 |

FOREIGN PATENT DOCUMENTS

| | | |
|---|---|---|
| GB | 2118302 A | 10/1983 |
| WO | 2005/040634 A2 | 5/2005 |

OTHER PUBLICATIONS

United Kingdom Intellectual Property Office Search Report dated Apr. 20, 2015 for Application GB1407829.9.

* cited by examiner

A collar configured to receive a sensitive component is formed.
610

A plurality of axial flexures configured to dampen shock in the axial direction from the base are formed.
620

A plurality of radial flexures extending axially between the collar and the axial flexures and connecting each of the plurality of axial flexures to the collar and configured to dampen force in the radial and/or rotational direction are formed.
630

A plurality of attachment pads disposed between adjacent radial flexures are formed, the pads each extending substantially axially from the collar toward the axial flexures and configured to attach to the sensitive component.
640

SHOCK ISOLATION PROTECTION OF SENSITIVE COMPONENTS

CROSS-REFERENCE TO RELATED APPLICATION

This application claims priority to United Kingdom application number 1407829.9, filed May 2, 2014 and having the title "Shock Isolation Protection of Sensitive Components," which in incorporated by reference herein in its entirety.

FIELD OF THE INVENTION

The present invention relates to shock isolation, and more particularly, is related to a shock isolating mount for an optical, electrical, or mechanical component or assembly which may be sensitive to shock accelerations.

BACKGROUND OF THE INVENTION

Handheld surveillance and weapon mounted sights are well known, and typically include a number of lens elements arranged to focus light from a scene viewed by a user via an eyepiece of the sight. Such sights often include image intensifier arrangements to increase the intensity of available light in the optical system to permit use of the sight in low-light conditions such as at night, or for conversion of non-visible light sources such as infrared.

However, previously proposed sights of the type described above suffer from significant disadvantages when used in the field, which can adversely affect their usefulness in real world conditions. For example, the image intensifier components may be more sensitive to shock and/or vibration than other components of the weapon sight, and may be damaged in the course of operation of the weapon, for example, by recoil from discharge of a firearm.

An image intensifier tube is a device that intensifies (or amplifies) low light level images to levels that can be seen with the human eye or detected by digital image sensors. In general, image intensifier tubes include a photocathode, a micro-channel plate (MCP), and a phosphor screen. Image intensifier tubes may collect the existing ambient light through the objective lens of the night vision device. The light may originate from natural sources, such as starlight or moonlight, or from artificial sources such as streetlights or infrared illuminators. The low level of incoming light, which consists of photons, enters the tube through an input window and strikes the photocathode. The photocathode is generally a very thin light sensitive layer deposited on the inside of an image intensifier input window that converts the photons into electrons and releases them into the vacuum of the tube. Image intensifier tubes generally operate under a vacuum, for example, of about 10-9 to 10-10 torrs, which protects the photocathode from oxidation and rapid destruction. Once released by the photocathode, these photo-electrons are accelerated and focused by a high electrical field towards the MCP. The MCP is generally a thin glass disc, for example, less than half a millimeter thick. The MCP produces a large number of secondary electrons for each received electron, which are accelerated toward the phosphor screen. One or more of these components may be damaged when an image intensifier tube is mounted to a weapon.

FIG. 1 shows an exemplary prior art mounting arrangement of an image intensifying tube 110. A sight 180 is mounted to a weapon 190 via sight mounts 185. The image intensifying tube 110 is directly mounted to the sight 180 by direct contact means, for example, by a threaded mount, or other similar attachment means. When the weapon 190 is discharged or otherwise subject to shock, impact, or vibration, the force is transmitted from the weapon 190 through the sight mounts 185 and the sight 180 to the image intensifying tube 110, potentially causing damage to the image intensifying tube 110.

Previous shock isolation solutions using padding, for example, elastomer pads, have suffered from several shortcomings, such as reduction in performance over time, non-linear impact response, degradation due to thermal conditions, movement during temperature excursions, and failure to return to original shape after deformation. Therefore, there is a need in the art to address the abovementioned shortcomings.

SUMMARY OF THE INVENTION

Embodiments of the present invention provide shock isolation protection of a sensitive component. Briefly described, the present invention is directed to a compact shock isolation apparatus. The apparatus is adapted for mounting a sensitive component to a base, the sensitive component including shock isolation features for all possible directions of application of the shock. The apparatus includes a collar, and a plurality of axial flexures mounted to the base to dampen an axial shock force. A plurality of radial flexures extend axially between the collar and the axial flexures, connecting each of the axial flexures to the collar to dampen radial and/or circumferential shock forces (i.e. in any other direction not protected by the axial flexures). A plurality of attachment pads disposed between adjacent radial flexures extend axially from the collar toward the axial flexures and attach to the sensitive component. The shock isolation apparatus supports the sensitive component in non-contacting proximity to the base.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

FIG. 6 is a flowchart illustrating an exemplary method of forming a shock isolating apparatus.

DETAILED DESCRIPTION

Figure 1:
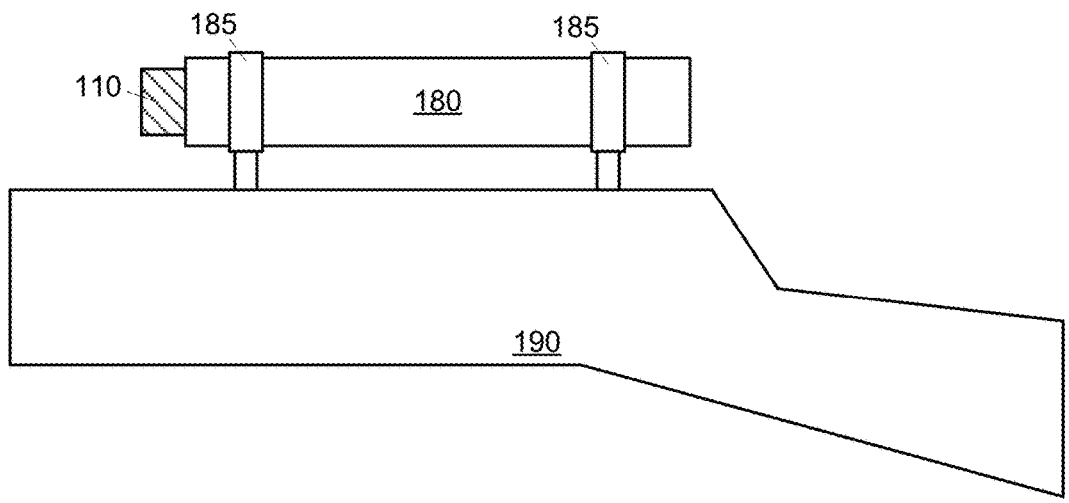
FIG. 1 is a schematic diagram depicting a prior art example of an image intensifier tube mounted to a sight.

The following definitions are useful for interpreting terms applied to features of the embodiments disclosed herein, and are meant only to define elements within the disclosure. No limitations on terms used within the claims are intended, or should be derived, thereby.

Directions of force are generally disclosed herein with respect to the typically cylindrical shape of a sensitive component (image intensifying tube). As used within this disclosure, "axial" means parallel to or along the axis of the cylinder, while "radial" means at right angles to the axis of the cylinder, and "circumferential" indicates a direction around the circumference of the cylinder.

As used within this disclosure, "substantially" means "very nearly," for example, a substantially axial direction refers to a direction parallel to the axial direction, or slightly varying from the axial direction, for example, within +/−five degrees or so. Similarly, "substantially circular" means circular within normal manufacturing tolerances as would be expected by persons having ordinary skill in the art.

In general, references to flexible items assume flexibility with regard to the disclosed directions in both positive and negative directions, for example, axial, radial, and circumferential.

In general, the proximal end of a mount refers to an end of the mount attached to a base, while the distal end of the mount refers to an end of the mount opposite the proximal end.

Reference will now be made in detail to embodiments of the present invention, examples of which are illustrated in the accompanying drawings. Wherever possible, the same reference numbers are used in the drawings and the description to refer to the same or like parts.

Embodiments of the present invention include compact devices and methods for mounting a device susceptible to damage from shock (hereafter, "sensitive component"), for example, an image intensifying tube attached to an object, for example, a weapon, such that the shock and/or vibration experienced by the object is at least partially attenuated between the object and the sensitive component. In the embodiments described herein, the sensitive component is generally mounted via an isolating mount, so that shock is attenuated by the isolating mount, rather than being directly transmitted to the sensitive component.

The embodiments provide compact design solutions that incorporate shock isolation in any direction to protect image intensifying tubes, or other optical or structurally delicate items, from excessive accelerations or structural loads that lead to failure. The mount may be formed of linear elastic materials, ensuring that the sensitive component returns to its original position after the structural load is removed.

Figure 2:
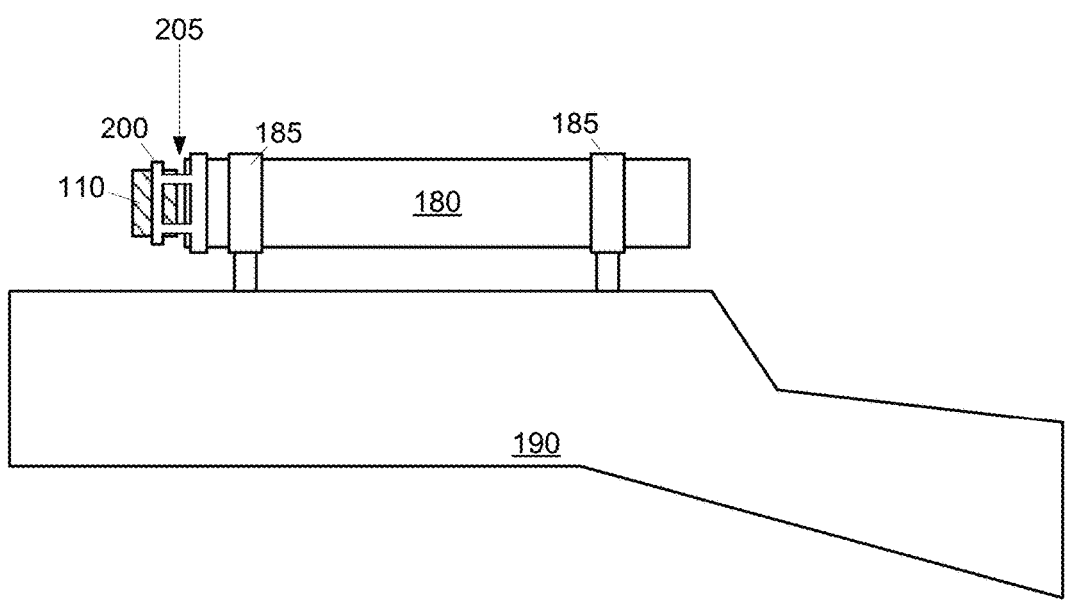
FIG. 2 is a schematic diagram depicting a simplified view of an exemplary first embodiment of an image intensifier tube isolation mount.

FIG. 2 shows a simplified depiction of an isolating mount 200 used to mount a generally cylindrical sensitive component 110, for example an image intensifying tube, to a sight 180. The sight 180 is mounted to a weapon 190 via sight mounts 185. The isolating mount 200 may be configured to provide shock isolation by effectively fully supporting the sensitive component 110 in space in a low stiffness (low frequency) manner, thus protecting the sensitive component 110 from higher frequency, high acceleration shocks. When the sensitive component 110 is mounted in the isolating mount 200, a gap 205 may separate the sensitive component 110 from the sight 180, so any shock force otherwise transmitted by the sight 180 may be attenuated by the isolating mount 200 before reaching the sensitive component 110.

Figure 3A:
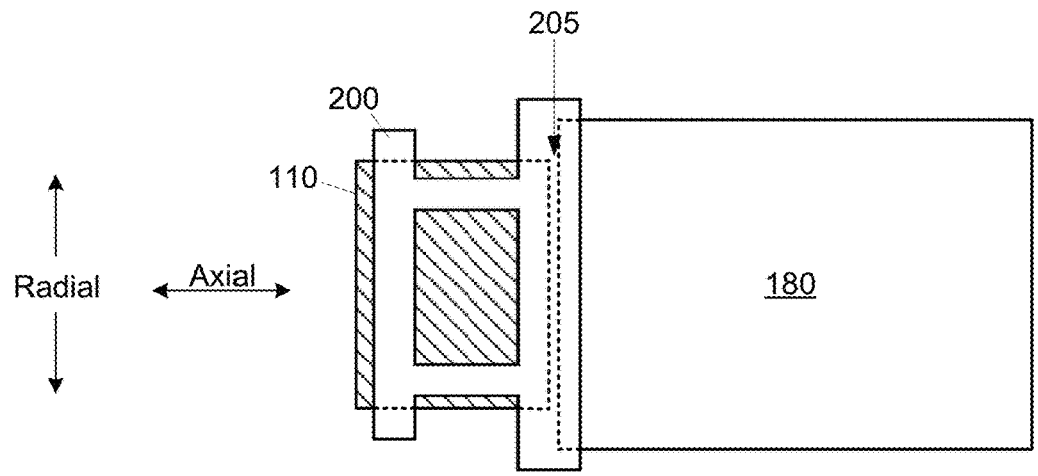
FIG. 3A is a schematic diagram illustrating a first mounting arrangement of the first mount embodiment.

FIG. 3A is a schematic diagram illustrating a first mounting arrangement of the sensitive component 110 to a base 180 with the first mount embodiment 200. The mount 200 secures the generally cylindrical sensitive component 110 to the base 180 with a gap 205 separating the sensitive component 110 and the base 180. The mount 200 further serves to isolate the sensitive component 110 from shocks experienced by the base 180, as discussed further below. The size of the gap 205 may vary with the application, but in general should be large enough to prevent contact between the sensitive component 110 and the base 180 under a maximum expected compressive force and/or acceleration directed in the axial direction. The dashed lines in FIG. 3A indicate portions of the sensitive component 110 and the base 180 concealed by the mount 200. In the embodiment shown in FIG. 3A, the sensitive component 110 extends outward from the distal end of the mount 200 relative to the base 180. In alternative embodiments, the sensitive component 110 may be flush with the distal end of the mount 200, or may be recessed within the distal end of the mount 200.

While FIG. 3A depicts the base 180 to be partially inset into the proximal end of the mount 200, in alternative embodiments, the proximal end of the mount 200 may be mounted flush with the base 180. The mount 200 may be rigidly attached to the base 180 by any of several appropriate means familiar to persons having ordinary skill in the art, for example, glue, screws, and the like. The base 180 may house additional optics to receive and/or transmit radiation from/to the sensitive component 110, for example, a weapons sight, and/or the base 180 may house a radiation sensor. Depending on the functions of the sensitive component 110, the base 180 may also house mechanical components used in conjunction with the sensitive component, as well as any optical and/or electronic components.

Figure 3B:
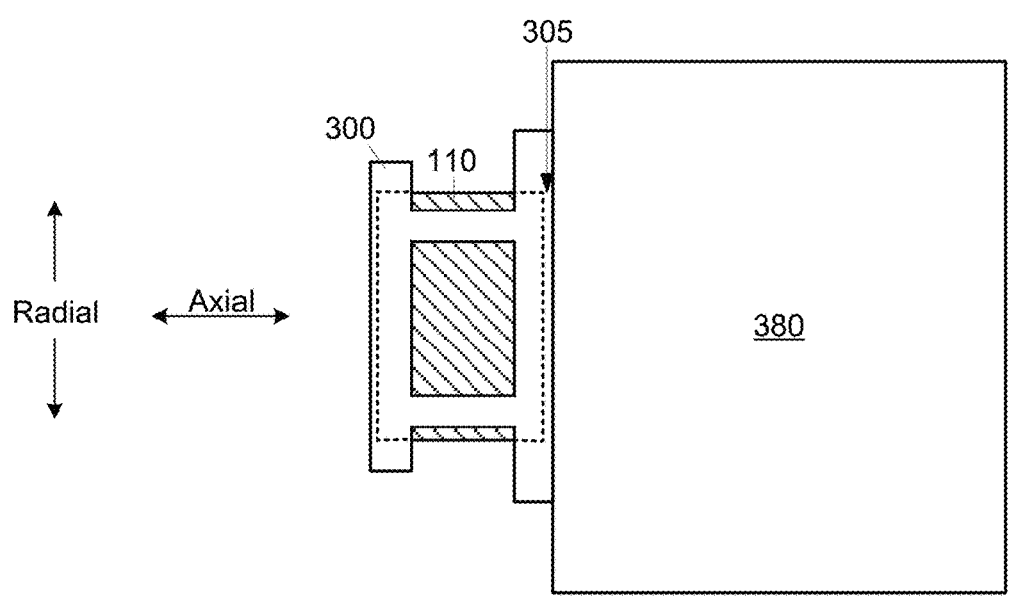
FIG. 3B is a schematic diagram illustrating a second mounting arrangement of the first mount embodiment.

FIG. 3B is a schematic diagram illustrating a second mounting arrangement of the first mount embodiment. A mount 300 supports a generally cylindrical sensitive component 110 in relation to a base 380, such that the sensitive component 110 is not in direct physical contact with the base 380. The mount 300 serves to isolate the sensitive component 110 from shocks and/or vibration experienced by the base 380, as discussed further below. In the second mounting arrangement shown by FIG. 3B, the base 380 is generally wider than the mount 300. While FIG. 3B depicts the base 380 to be disposed flush against the mount 300, in alternative embodiments, the mount 300 may be mounted partially inset into the base 380.

Figure 3C:
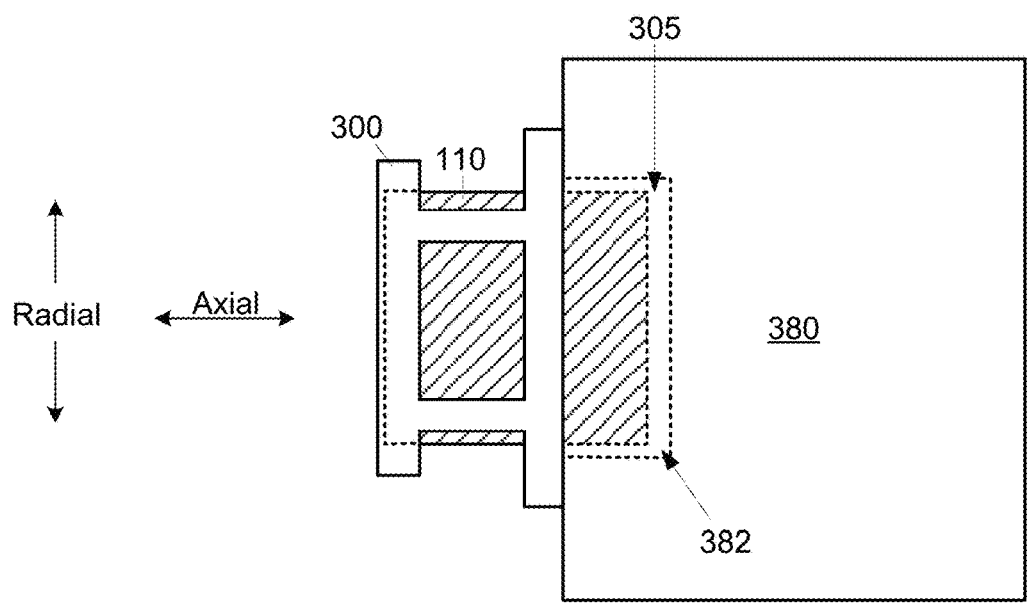
FIG. 3C is a schematic diagram illustrating a third mounting arrangement of the first mount embodiment.

FIG. 3C illustrates a third mounting arrangement of the first mount embodiment. Under the third mounting arrangement, the base 380 includes a recess 382, with a portion of the sensitive component 110 extending beyond the proximal end of the mount and into the recess 382. A gap 305 separates the sensitive component 110 from directly contacting any portion of the base 380.

Figure 3D:
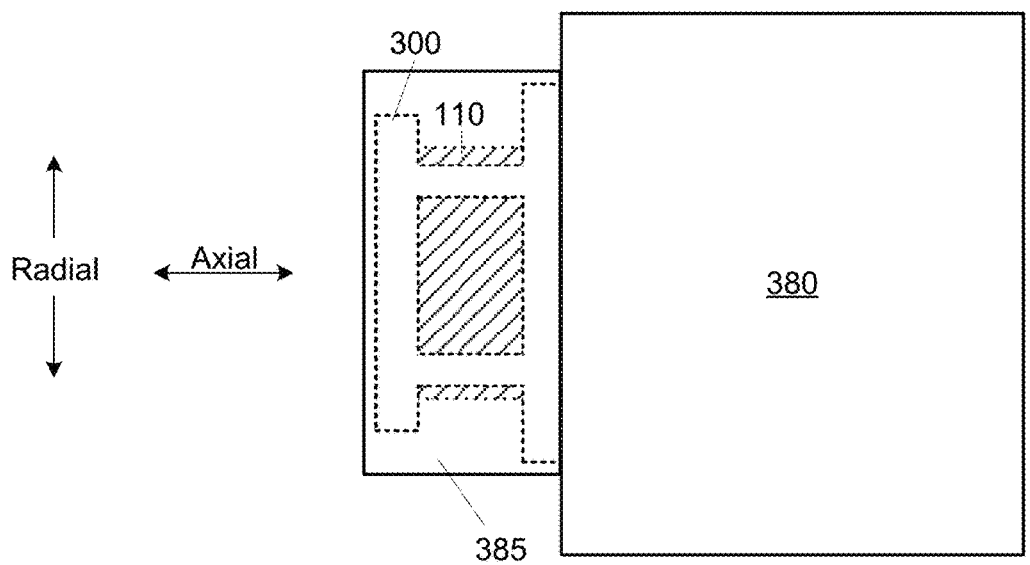
FIG. 3D is a schematic diagram illustrating a cover over the first mount embodiment.

In some embodiments, an enclosure 385 may partially or entirely cover the mount 300, as shown in FIG. 3D. The dashed lines in FIG. 3D indicate the sensitive component 110 and the mount 300 are concealed by the enclosure 385. It is desirable that the interior portion of the enclosure 385 be physically separated from the mount 300 and the sensitive component 110 in embodiments where the sensitive component 110 extends beyond the distal end of the mount 300. The separation between the enclosure 385 and the mount 300 should be large enough so that deformation of the mount 300 due to shock forces does not cause the mount 300 to come in contact with the enclosure 385. Separation between the enclosure 385 and the mount 300 ("rattle space") prevents any shock received by the enclosure 385 from being transmitted to the mount 300 and sensitive component 110.

Figure 4:
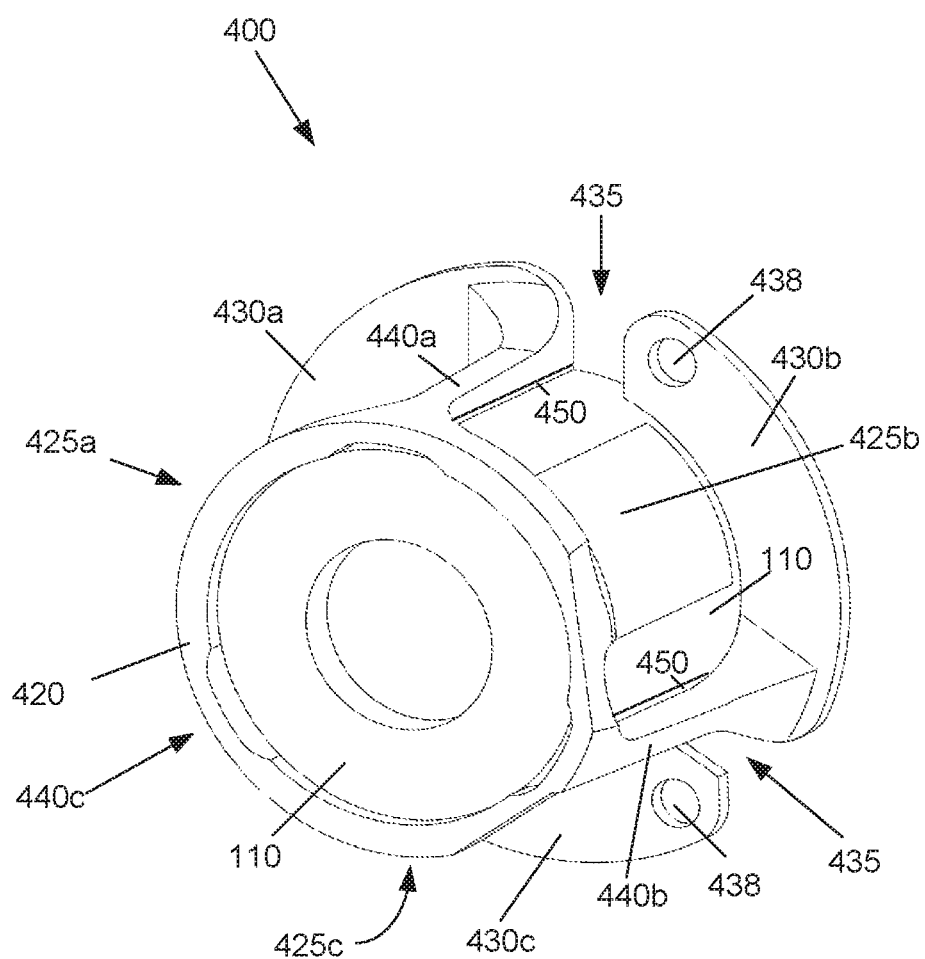
FIG. 4 is a schematic diagram depicting a detailed perspective view of the exemplary first embodiment.
Figure 5:
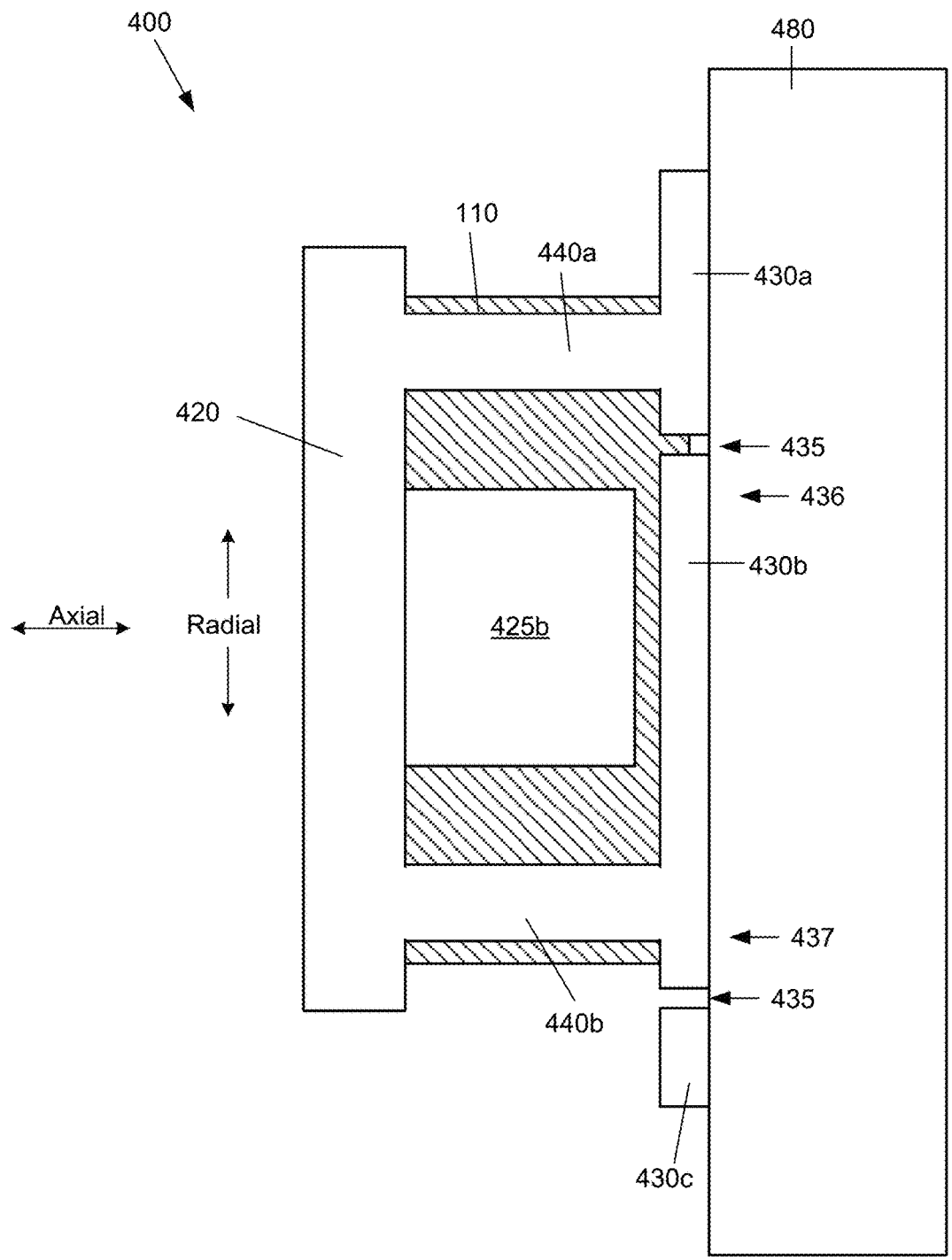
FIG. 5 is a schematic diagram depicting a side view of the exemplary first embodiment.

FIGS. 4 and 5 provide more detailed views of the mounts 200 (FIGS. 2, 3A) and 300 (FIGS. 3B, 3C, 3D). A mount 400 is configured to support a generally cylindrical shaped sensitive component 110 in relation to a base 480 (shown in FIG. 5 but omitted in FIG. 4 for clarity of the perspective view). It should be noted the base 480 is simplified in FIG. 5 for clarity, and the mount 400 may be configured with the base 480 as depicted in any of FIGS. 3A-3D. A substantially ring-shaped collar 420 located at a distal end of the mount 400 is configured to receive the sensitive component 110. However, the collar 420 itself is not in direct physical contact with the sensitive component 110, but instead indirectly in contact by extension through attachment pads 425a-c, as described below.

Three axial flexures 430a-c located at a proximal end of the mount 400 are individually mounted to the base 480 and arranged to substantially surround a portion of the base 480 and configured to isolate shock between the base 480 and the sensitive component 110 in the axial direction. For example, the axial flexures 430a-c may be formed of a material and/or geometry having a low stiffness with regard to low frequencies, thereby absorbing and attenuating axially directed shock and/or vibration that would otherwise be axially transmitted by a more rigid material. The axial flexures 430a-c are not in direct physical contact with the sensitive component 110. Each of the axial flexures 430a-c may be substantially similar in shape, which may generally be shaped as a flat plate with regard to the base 480.

The three axial flexures 430a-c may be shaped in profile as nearly 120 degree arcs of a circle, and may be arranged on the base 480 in a circular fashion, with a gap 435 between each of axial flexures 430a and 430b, axial flexures 430b and 430c, and axial flexures 430c and 430a. The gaps 435 serve to prevent transmission of vibration, force, contact and/or or pressure between any two adjacent axial flexures 430 by physically isolating adjacent axial flexures 430.

Under the first embodiment, the mount 400 includes three beam-like radial flexures 440a-c extending substantially axially between the collar 420 and the axial flexures 430a-c. Note, radial flexure 440c is not visible from the perspective of FIGS. 4 and 5, but is generally understood to be present on the far side of the mount, substantially evenly spaced from axial flexures 440a and 440b. The radial flexures 440a-c connect each of the three of axial flexures 430a-c to the collar 420 and are configured to isolate shock transmitted in the radial and/or circumferential direction (or any direction not protected by the axial flexures). For example, the radial flexures 440a-c may be formed of a material and/or geometry having a low stiffness, and therefore a low frequency, with regards to the shock pulses, thereby providing shock isolation in a radial and/or a circumferential (rotational) direction that would otherwise be transmitted by a more rigid material and/or geometry configuration. In preferred embodiments, the radial flexures 440a-c are formed of the same material as the axial flexures 430a-c. In alternative embodiments, the radial flexures 440a-c may be formed of a different material, for example, a material having absorption properties better tuned to absorb forces and or shocks of a frequency expected in the radial direction. The radial flexures 440a-c are positioned so they are not in direct physical contact with the sensitive component 110. Under the first embodiment, the radial flexures 440a-c may be substantially evenly spaced around the sensitive component 110, and formed generally perpendicular to the plane of the base 480 and the axial flexures 430a-c, but other orientations are possible.

As shown in FIG. 4, the base of each of the radial flexures 440a-c may flare outward radially and or circumferentially where they attach to the axial flexures 430a-c respectively. The radial flexures 440a-c may be substantially the same length, so that collar 420 is positioned substantially parallel to the axial flexures 430a-c. Each of the radial flexures 440a-c may be substantially similar in shape.

Under the first embodiment, three attachment pads 425a-c are disposed between adjacent radial flexures 440a-c, extending substantially axially from the collar 420 toward the axial flexures 430a-c, and configured to support the sensitive component 110. The attachment pads 425a-c may have an arc shaped cross section, and may be relatively thin compared to the collar 420. The attachment pads 425a-c may be in direct physical contact with the sensitive component 110, or there may be an adhesive material disposed between the attachment pads 425a-c and the sensitive component 110, as described below. The attachment pads 425a-c may be attached to the sensitive component 110 by any of several means, for example, by an adhesive substance such as an epoxy compound. Each of the attachment pads 425a-c may be substantially similar in shape.

The attachment pads 425a-c may be configured to exert a retaining force toward the sensitive component 110. The distal ends of the attachment pads 425a-c may be attached to the collar 420 at the inner circumference of the collar 420. The attachment pads 425a-c may each be substantially centered circumferentially with respect to respective adjacent radial flexures 440a-c. In general, the proximal ends of the attachment pads 425a-c do not extend fully from the collar 420 to the axial flexures 430a-c, thereby preventing axial shock from propagating directly from the base 480 through the axial flexures 430a-c to the attachment pads 425a-c.

As mentioned above, the attachment pads 425a-c may be attached directly to the sensitive component 110, or there may be a layer of adhesive material disposed between the attachment pads 425a-c and the sensitive component 110. Damping of vibration between the attachment pads 425a-c and the sensitive component 110 may be achieved by various means, using damping material 450, for example, but not limited to soft adhesive or closed cell foam, placed between the radial flexures 440a-c and sensitive component 110 and/or the axial flexures 430a-c and the sensitive component 110.

While the outer circumference of the collar 420 is depicted as being substantially circular, the inner circumference of the collar 420 is smaller corresponding to locations adjacent to the distal ends of the attachment pads 425.

In the preferred embodiment, the mount 400 including the collar 420, the attachment pads 425a-c, the radial flexures 440a-c, and the axial flexures 430a-c are formed as a unitary piece of a single material. In alternative embodiments, one or more of the collar 420, the attachment pads 425a-c, the radial flexures 440a-c, and/or the axial flexures 430a-c may be formed as separate components, and attached during manufacture. If formed as separate components, the collar 420, the attachment pads 425a-c, the radial flexures 440a-c, and the axial flexures 430a-c may be formed of different materials from one another. However, a unitary construction for the mount 400 is generally advantageous over a compound construction, as separate components need to be attached via attachment points able to withstand high shock forces, thereby adding weight and size to the mount 400.

While FIGS. 4 and 5 depict the mount 400 having three axial flexures 430a-c, three radial flexures 440a-c, and three attachment pads 425a-c, in alternative embodiments there may be more or fewer axial flexures 430, radial flexures 440, and attachment pads 425, for example, two, four, five, or more. In general, while not necessary, it is preferable that the radial flexures 440 be evenly spaced around the sensitive component 110, and likewise the axial flexures 430 and attachment pads 425.

As depicted in FIGS. 4 and 5, the attachment pads 425a-c extend axially from the collar 420 toward the axial flexures 430a-c, leaving a small gap between the end of the attachment pads 425a-c and the axial flexures 430a-c. In alternative embodiments, the attachment pads 425a-c may be shorter, for example, extending halfway or less from the collar 420 toward the axial flexures 430a-c, or the attachment pads 425a-c may not extend axially from the collar 420 toward the axial flexures 430a-c at all, instead merely serving as inward radial projections from the collar 420. Similarly, in alternative embodiments the width of the attachment pads 425a-c in the circumferential direction may be wider or narrower than depicted in FIGS. 4 and 5.

The mount 400 is configured to support the sensitive component 110 in close non-contacting proximity to the base 480. The space separating the sensitive component 110 from the base 480 prevents direct shock transmission between the base 480 and the sensitive component 110. The mount 400 is preferably formed of a linear elastic material configured to deform under a structural load and return to an original position when the structural load is removed. The mount 400 may be constructed from any material, providing the elastic moduli and strength properties are adequate, as described further below.

The size of the gap between the component 110 and the base 480 is preferably small, but large enough to prevent significant dislocation and/or deformation of the mount 400 that would allow the component 110 and the base 480 to come into direct contact with one another, and also sufficient to provide adequate shock isolation 'rattle gap' distance.

It may be desirable to pack the space around the perimeter between the sensitive component 110 and the base 480 with an opaque dampening material to prevent light from entering this space, and to prevent transmission of vibration between the sensitive component 110 and the base 480.

The mount 400 achieves shock isolation between the base 480 and the sensitive component 110 by the above described specific geometrical arrangement of six spring/flexure devices 430a-c, 440a-c, which provide shock isolation by effectively fully supporting the sensitive component 110 in space, in a low stiffness (low frequency) manner, thus protecting the sensitive component 110 from higher frequency, high acceleration shocks in any direction. In particular, the combination of axial flexures 430 and radial flexures 440 combine to isolate the sensitive component 110 from shock coming from any direction or combination of directions, both translational and rotational. For shocks in a single direction, the number and/or type of flexures 430, 440 may be reduced.

As noted previously, the mount 400 may be attached to the base 480 by one of several attachment means, for example, by a screw (not shown) passing through an aperture 438 in the axial flexure 430a-c and into the base 480. The mount 400 is attached to the base 480 via the axial flexures 430a-c. The attachment point may be located at a first end 436 of each axial flexure 430a-c so a second end 437 opposite the first end 436 can be free to deform in radial and/or circumferential directions. The radial flexures 440a-c may be mounted at the second end 437 of the axial flexure 430a-c. Since the proximal ends of the radial flexures 440a-c may be mounted to the unsecured second ends of the axial flexures 430a-c, the proximal ends of the radial flexures 440a-c may flex and move with the unsecured second ends of the axial flexures 430a-c deforming under shock force from one or more directions.

In alternative embodiments, the attachment between the axial flexure 430a-c and the base 480 may be at the second end 437 or both the first end 436 and second end 437, and the radial flexure 440 may be attached to the axial flexure 430 at the first end 436, the second end 437, or any location between the first end 436 and second end 437.

FIG. 6 is a flowchart 600 of an exemplary method for manufacturing a shock isolating apparatus (mount 400) configured to isolate a sensitive component 110 mounted to a base 480 from shock transmitted to the sensitive component 110 via the base 480. The description of FIG. 6 makes reference to the elements of FIGS. 4-5.

It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

The sensitive component 110, for example, a cylindrically shaped sensitive component, has an axial direction and a radial direction. A collar 420 configured to receive the sensitive component 110 is formed, as shown by block 610. A plurality of axial flexures 430a-c configured to be individually mounted to the base 480 and configured to attenuate shock in the axial direction are formed, as shown by block 620. A plurality of radial flexures 440a-c extending substantially axially between the collar 420 and the axial flexures 430a-c connecting between each of the plurality of axial flexures 430a-c and the collar 420 is formed, as shown by block 630. The radial flexures 440a-c are configured to attenuate shock in the radial direction and in a rotational direction relative to the axial direction.

A plurality of attachment pads 425a-c disposed between adjacent radial flexures 440a-c are formed, as shown by block 640. The attachment pads 425a-c extend substantially axially from the collar 420 toward the axial flexures 430a-c, and are configured to attach to the sensitive component 110. The mount 400 is configured to support the sensitive component 110 in non-contacting proximity to the base 480.

The mount 400 is configured to isolate transmission of shock from a base 480 to the sensitive component 110. While total isolation of shock is desirable, as used herein, isolation refers to reduction or attenuation of shock forces. Shock, for example caused by discharge of a firearm, may be a composite of several forces, for example an initial shock pulse in one or more directions, followed by, or coincident with, one or more secondary pulses, and subsequent ringing or vibration of the physical structure of the firearm that typically decays over a short time.

Figure 7:
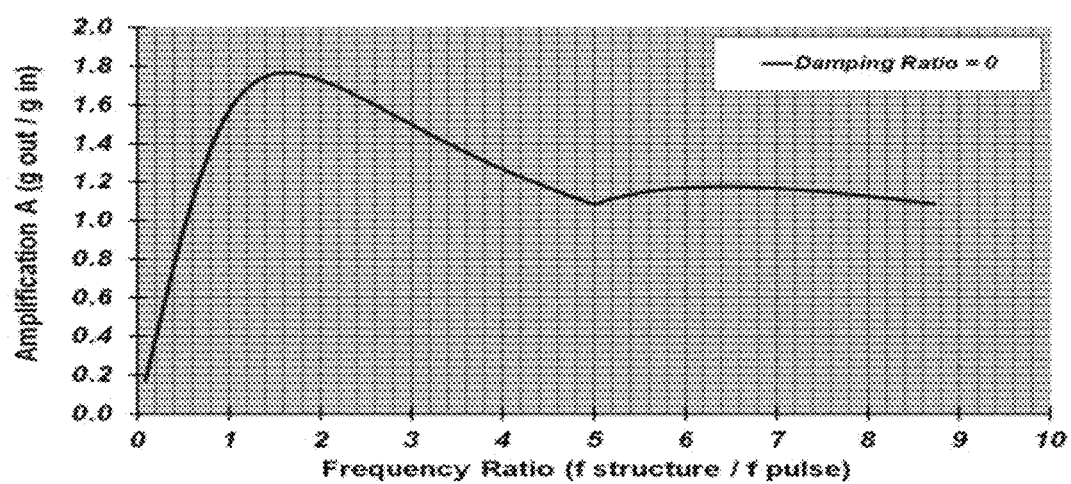
FIG. 7 is a graph plotting an amplification response for a single degree of freedom system subjected to a half sine shock pulse.

FIG. 7 shows a typical amplification response for a single degree of freedom system subjected to a half sine shock pulse. Typically, it is desirable for a shock mount to operate in the curve region where the frequency ratio is less than 0.4. This then would then limit any shock responses to levels less than 0.75 times the input. Therefore, to achieve this, any structural design scheme would have a resonant frequency which is less than 0.4 times the shock pulse frequency. This drives any shock isolation device design.

While FIG. 7 illustrates the basic principle in one direction, calculations for designing an actual shock isolation device must generally consider multiple degrees of freedom, with multiple directions of load, variable magnitude pulses, with wide ranging pulse widths. Several factors are used in the design to determine the materials used and the specific dimensions of the mount 400. Factors used in these calculations include, but are not limited to the size and mass of the sensitive component 110, the magnitude, direction, duration and frequency of the shock pulses, the amount of space available for the mount 400 to be located, and other considerations. The mount 400 is sized according to the mass and size of sensitive component 110, shock magnitude, pulse width and direction, space envelope and spring/flexure material and geometry properties. When these factors are commensurate, then the mount 400 isolates shock in any direction.

The choice of material for the mount 400 generally is generally a result of the design constraints described above. Example choices of material for the mount 400 include, but are not limited to metals such as high strength aluminum, titanium or steel, plastics, ceramics, or other materials. Some materials may have elasticity or flexibility ranges based on the orientation of the material, and this may also be considered in the design of the mount 400.

Dimensions of the axial flexures 430 and/or radial flexures 440, for example, cross section and/or length dimensions may be adjusted to suit specific space and/or performance criteria, ensuring the appropriate low stiffness/low frequency transmission (resonance) characteristics are obtained commensurate with the mass, geometry and survivability limits of the sensitive component 110 and the shock pulse definition. Similarly, flexure angular placement may be adjusted (for example, a departure from 120° placement of three flexures), providing the required low stiffness/low frequency performance is commensurate with the mass, geometry and survivability limits of the sensitive component 110 and the shock pulse definition.

In summary, it will be apparent to those skilled in the art that various modifications and variations can be made to the structure of the present invention without departing from the scope or spirit of the invention. For example, fewer springs/flexures may be used if the shock is known to only apply in specific, limited directions. Coil springs or bellevilles may be used instead of the flexures/springs, to achieve the same principle of shock isolation, but this may be problematic if space envelope is limited as coil springs or bellevilles are likely to take up more space. Elastomeric (glue) pads may be used instead of the flexures springs, to achieve the same principle of shock isolation, but this may be problematic if shock levels are high, as elastomeric pads stiffen up with compression, being non-linear in their behavior, and can exert undesirable thermal displacements.

The shape of the flexures can be changed, providing they still result in the necessary stiffness in the desired directions. For example, the flexures could be curved, or combined into a complex shape. Damping may be achieved by various alternative means. While closed cell foam has desirable damping characteristics, damping may instead be provided by alternative dampers, such as elastomeric pads, dashpots etc.

The orientation of any input and/or output to the sensitive component, for example, optical input and/or output, is generally irrelevant to the function of the mount. In the discussion above, an input of a sensitive component, for example, an optical input, has generally been assumed herein to be located at the distal end of the mount. However, there is no objection to embodiments where the input of the sensitive component may be located at or near the proximal end of the mount. Likewise, an output of the sensitive component may be located at either the proximal or distal end of the mount, depending on the desired orientation.

While the sensitive component has been described as being generally cylindrical in shape, in alternative embodiments the sensitive component may be differently shaped, for example, as a rectangular block, and the mount may be adapted accordingly, for example, with a square shaped collar and two or four axial flexures, attachment pads and radial flexures. Similar adaptations for differently shaped sensitive component may be used to provide flexibility and shock isolation in all directions according to the methodology described above. A collar may be shaped to adapt to the profile shape of a sensitive component shaped as, for example, but not limited to, an oval, an ellipse, a rectangle, a pentagon, a hexagon, any other polygon, or a profile having any combination of straight and curved lines.

In view of the foregoing, it is intended that the present invention cover modifications and variations of this invention provided they fall within the scope of the following claims and their equivalents.

What is claimed is:

1. A compact shock isolation apparatus for mounting a sensitive component to a firearm, the sensitive component comprising a radial direction and an axial direction, comprising:
   a collar configured to receive the sensitive component;
   a plurality of axial flexures each having a first end mounted to the firearm and extending therefrom and configured to attenuate a shock force and/or acceleration from a discharge of the firearm to the sensitive component in the axial direction;
   a plurality of radial flexures extending substantially axially between the collar and the axial flexures connecting each of the plurality of axial flexures to the collar and configured to attenuate a shock force and/or acceleration from the discharge of the firearm to the sensitive component in the radial direction and a shock force and/or acceleration in a rotational direction relative to the axial direction; and
   a plurality of attachment pads disposed between adjacent radial flexures, extending substantially axially from the collar toward the axial flexures and configured to attach to the sensitive component,
   wherein the shock isolation apparatus is configured to isolate transmission to the sensitive component of a shock pulse from the discharge of the firearm by attenuating a shock response of the sensitive component to a level less than 0.75 times the level of the shock pulse, each of the plurality of axial flexures is shaped in profile as an arc of a circle extending from the first end to a second end attached to a corresponding one of the plurality of radial flexures, and the shock isolation apparatus is configured to support the sensitive component in non-contacting proximity to the firearm and the collar is not in direct physical contact with the sensitive component.

2. The apparatus of claim 1, wherein the sensitive component is generally cylindrical in shape, and the collar is substantially circular in shape.

3. The apparatus of claim 1, wherein the apparatus further comprises a linear elastic material configured to deform from an original position under a structural load and to return to the original position when the structural load is removed.

4. The apparatus of claim 3, wherein the shock isolation apparatus comprises aluminum.

5. The apparatus of claim 1, wherein there is a one-to-one correspondence of the number of axial flexures and the radial flexures, and a one-to-one correspondence of the number of radial flexures and the attachment pads.

6. The apparatus of claim 5, consisting of the collar, three axial flexures, three radial flexures, and three attachment pads.

7. The apparatus of claim 1, wherein:
the axial flexures are substantially evenly spaced apart around a perimeter of the apparatus;
the radial flexures are substantially evenly spaced apart around the perimeter of the apparatus; and
the attachment pads are substantially evenly spaced apart around the perimeter of the apparatus.

8. The apparatus of claim 1, wherein the plurality of axial flexures are mounted to the firearm with a gap separating each adjacent axial flexure.

9. The apparatus of claim 1, wherein the plurality of axial flexures are substantially parallel to the collar.

10. The apparatus of claim 1, wherein the shock isolation apparatus and the sensitive component are only in physical contact via the plurality of attachment pads.

11. The apparatus of claim 1, wherein the plurality of axial flexures are arranged to substantially surround a portion of the firearm.

12. The apparatus of claim 1, wherein the collar further comprises a collar profile shape consisting of one of the group of an oval, an ellipse, a rectangle, a pentagon, a hexagon, and another polygon, the collar shape corresponding to a profile shape of the sensitive component.

13. The apparatus of claim 1, further comprising a vibration dampening material disposed between the plurality of radial flexures and the sensitive component.

14. A method for manufacturing a shock isolating apparatus configured to isolate a sensitive component mounted to a firearm from a shock pulse from a discharge of the firearm transmitted to the sensitive component, the sensitive component comprising an axial direction and a radial direction, comprising the steps of:
forming a collar configured to receive the sensitive component;
forming a plurality of axial flexures each having a first end mounted to the firearm and extending therefrom and configured to dampen shock force and/or acceleration from the shock pulse in the axial direction;
forming a plurality of radial flexures extending substantially axially between the collar and the axial flexures connecting each of the plurality of axial flexures to the collar and configured to attenuate shock force and/or acceleration from the shock pulse in the radial direction and in a rotational direction relative to the axial direction; and
forming a plurality of attachment pads disposed between adjacent radial flexures, extending substantially axially from the collar toward the axial flexures and configured to attach to the sensitive component,
wherein each of the plurality of axial flexures is shaped in profile as an arc of a circle extending from the first end to a second end attached to a corresponding one of the plurality of radial flexures, and the shock isolation apparatus is configured to support the sensitive component in non-contacting proximity to the firearm and the collar is not in direct physical contact with the sensitive component.

15. The method of claim 14, wherein:
the axial flexures are formed to be substantially evenly spaced apart around a perimeter of the apparatus;
the radial flexures are formed to be substantially evenly spaced apart around the perimeter of the apparatus; and
the attachment pads are formed to be substantially evenly spaced apart around the perimeter of the apparatus.

16. The method of claim 15, consisting of the collar, three axial flexures, three radial flexures, and three attachment pads.

17. The method of claim 14, wherein the plurality of axial flexures are mounted to the firearm with a gap separating each adjacent axial flexure.

* * * * *